US008818451B2

(12) United States Patent
Rao et al.

(10) Patent No.: US 8,818,451 B2
(45) Date of Patent: *Aug. 26, 2014

(54) IMAGE NETWORKS FOR MOBILE COMMUNICATION

(71) Applicants: Rekha K. Rao, Palo Alto, CA (US); IP Holdings, Inc., Palo Alto, CA (US)

(72) Inventors: Sunil K. Rao, Palo Alto, CA (US); Raman K. Rao, Palo Alto, CA (US)

(73) Assignee: IP Holdings, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,808

(22) Filed: Apr. 17, 2013

(65) Prior Publication Data
US 2013/0295991 A1    Nov. 7, 2013

Related U.S. Application Data

(63) Continuation of application No. 10/769,621, filed on Jan. 30, 2004, now Pat. No. 8,483,754.

(51) Int. Cl.
*H04M 1/00* (2006.01)
*H04N 7/18* (2006.01)
*H04N 5/222* (2006.01)
*H04B 1/38* (2006.01)

(52) U.S. Cl.
USPC ............ 455/556.1; 348/64; 348/333.05; 455/566

(58) Field of Classification Search
USPC ............ 348/14.11, 14.13, 14.02, 64, 333.05; 455/403, 410, 414.1, 414.4, 550.1, 455/556.1, 557, 566
See application file for complete search history.

(56) References Cited

U.S. PATENT DOCUMENTS

| 4,117,542 A | 9/1978 | Klausner et al. |
| 4,386,412 A | 5/1983 | Ito |
| 4,465,401 A | 8/1984 | Stoddord et al. |

(Continued)

FOREIGN PATENT DOCUMENTS

| EP | 0849925 A1 | 6/1998 |
| WO | WO 92/03884 | 3/1992 |

OTHER PUBLICATIONS

U.S. Appl. No. 10/878,666, filed Jun. 28, 2004 in the name of Rao et al., entitled "Configurable Interfaces for Authenticated Communication".

*Primary Examiner* — Yuwen Pan
*Assistant Examiner* — Ayodeji Ayotunde
(74) *Attorney, Agent, or Firm* — Levine Bagade Han LLP

(57) ABSTRACT

A mobile communication system based on images, enabling communication between a plurality of mobile devices and servers, wherein the images have associated additional properties in the nature of voice, audio, data and other information. The system further enabling the formation of one or more image networks wherein the images are stored, organized, connected and linked to each other by one or more methods inclusive of one to one connection between images, a hierarchical connection between images and or other methods of connection between images to facilitate efficient image based communication between mobile devices, stationary devices and servers based on the mobile device identification, mobile device specific profiles and user specific profiles. The imaged base network system further having the ability to learn and form intelligent association between objects, people and other entities; between images and the associated data relating to both animate and inanimate entities for intelligent image based communication in a network.

43 Claims, 11 Drawing Sheets

(56) References Cited

U.S. PATENT DOCUMENTS

| | | | |
|---|---|---|---|
| 4,514,920 A | 5/1985 | Shafrir et al. |
| 4,517,660 A | 5/1985 | Fushimoto et al. |
| 4,670,747 A | 6/1987 | Borras et al. |
| 4,675,653 A | 6/1987 | Priestley |
| 4,696,054 A | 9/1987 | Tsugei et al. |
| 4,719,338 A | 1/1988 | Avery et al. |
| 4,772,876 A | 9/1988 | Laud |
| 4,844,637 A | 7/1989 | Buisson et al. |
| 4,853,888 A | 8/1989 | Lata et al. |
| 4,908,866 A | 3/1990 | Goldwasser et al. |
| 4,912,640 A | 3/1990 | Tsugei |
| 4,943,994 A | 7/1990 | Ohtsuka et al. |
| 5,034,858 A | 7/1991 | Kawamoto et al. |
| 5,164,723 A | 11/1992 | Nebenzahl |
| 5,195,130 A | 3/1993 | Weiss et al. |
| 5,198,798 A | 3/1993 | Lietzow et al. |
| 5,263,118 A | 11/1993 | Cornelison |
| 5,276,794 A | 1/1994 | Lamb, Jr. |
| 5,335,276 A | 8/1994 | Thompson et al. |
| 5,351,189 A | 9/1994 | Doi et al. |
| 5,379,341 A | 1/1995 | Wan |
| 5,396,443 A | 3/1995 | Mese et al. |
| 5,410,738 A | 4/1995 | Diepstraten et al. |
| 5,440,502 A | 8/1995 | Register |
| 5,465,401 A | 11/1995 | Thompson |
| 5,493,692 A | 2/1996 | Theimer et al. |
| 5,496,992 A | 3/1996 | Madan et al. |
| 5,502,460 A | 3/1996 | Bowen |
| 5,513,242 A | 4/1996 | Mukerjee et al. |
| 5,517,553 A | 5/1996 | Sato |
| 5,539,391 A | 7/1996 | Yuen |
| 5,552,806 A | 9/1996 | Lenchik |
| 5,555,258 A | 9/1996 | Snelling et al. |
| 5,559,794 A | 9/1996 | Willis et al. |
| D374,675 S | 10/1996 | Sakai et al. |
| 5,561,446 A | 10/1996 | Montlick |
| 5,565,929 A | 10/1996 | Tanaka |
| 5,566,205 A | 10/1996 | Delfine |
| 5,572,576 A | 11/1996 | Klausner et al. |
| 5,577,118 A | 11/1996 | Sasaki et al. |
| 5,594,953 A | 1/1997 | Ross et al. |
| 5,604,688 A | 2/1997 | Chu et al. |
| 5,615,277 A | 3/1997 | Hoffman |
| 5,644,338 A | 7/1997 | Bowen |
| 5,660,246 A | 8/1997 | Kaman |
| 5,673,080 A | 9/1997 | Biggs et al. |
| 5,742,905 A | 4/1998 | Pepe et al. |
| 5,751,835 A | 5/1998 | Topping et al. |
| 5,760,773 A | 6/1998 | Berman et al. |
| 5,778,054 A | 7/1998 | Kimura et al. |
| 5,784,888 A | 7/1998 | Termuehlen |
| 5,793,413 A | 8/1998 | Hylton et al. |
| 5,793,639 A | 8/1998 | Yamazaki |
| 5,797,001 A | 8/1998 | Augenbraun et al. |
| 5,797,089 A | 8/1998 | Nguyen |
| 5,847,698 A | 12/1998 | Reavey et al. |
| 5,848,373 A | 12/1998 | DeLorme et al. |
| 5,854,997 A | 12/1998 | Sukeda et al. |
| 5,878,399 A | 3/1999 | Peralto |
| 5,901,222 A | 5/1999 | Macor |
| 5,941,947 A | 8/1999 | Brown et al. |
| 6,046,730 A | 4/2000 | Bowen et al. |
| 6,058,304 A | 5/2000 | Callaghan et al. |
| 6,121,960 A | 9/2000 | Carroll et al. |
| 6,141,592 A | 10/2000 | Pauly |
| 6,209,034 B1 | 3/2001 | Gladwin et al. |
| 6,268,806 B1 | 7/2001 | Frager et al. |
| 6,295,052 B1 | 9/2001 | Kato et al. |
| 6,358,202 B1 | 3/2002 | Arent |
| 6,440,069 B1 | 8/2002 | Raymond et al. |
| 6,440,502 B1 | 8/2002 | Lee |
| 6,525,750 B1 | 2/2003 | Knox |
| 6,587,700 B1 | 7/2003 | Meins et al. |
| 6,791,601 B1 | 9/2004 | Chang et al. |
| 6,882,859 B1 | 4/2005 | Rao et al. |
| 7,254,223 B1 | 8/2007 | Henderson |
| 8,183,998 B2 | 5/2012 | Rao et al. |
| 8,483,754 B2 * | 7/2013 | Rao et al. ............ 455/556.1 |
| 2002/0072860 A1 | 6/2002 | Amano |
| 2002/0103789 A1* | 8/2002 | Turnbull et al. ............ 707/3 |
| 2003/0041032 A1 | 2/2003 | Ballin et al. |
| 2003/0112148 A1 | 6/2003 | Belliveau |
| 2007/0191070 A1 | 8/2007 | Rao |
| 2011/0059777 A1 | 3/2011 | Rao |

* cited by examiner

IMAGE NETWORKS FOR MOBILE COMMUNICATION

CROSS-REFERENCE TO RELATED APPLICATIONS

This application is a continuation of U.S. patent application Ser. No. 10/769,621, filed on Jan. 30, 2004, the content of which is incorporated herein by reference in its entirety.

BACKGROUND OF THE INVENTION

In the prior art the primary methods of communication are primarily voice based such as by means of a communication device such as the telephone, cellular telephone or other mobile devices augmented as needed by textual methods such as handwriting, in recent times the communication methods have expanded to include such digital and electronic methods as e-mail with the ability to receive files of voice, audio, video and data files as attachments and the means for recoding, playing and or viewing these files. In the prior art these files are discrete and separate and do not necessarily exist as one composite file thus limiting utility.

However, the primary means of communication in the prior art is not image based whereas human beings by nature relate better to image based communication and visual stimuli. The ability of human beings to recognize an image and respond to an image is far superior to other cognitive senses and is preferred by itself and or in combination with other methods such as voice. The communication systems of the prior art have a number of limitations making communication between individuals that have a physical limitation such as a hearing impairment or a language barrier difficult. Consequently, it is desirable to have a means for communicating primarily by means of images coupled as desired by the user with one or more other methods selected by the user such as voice, audio, text and data and other methods as deemed appropriate for the desired application. In the prior art the means for interfacing with a mobile device such as cell phone has certain limitations for data entry being key stroke based, pen based tier touch screens or voice based. There is a need for image based communication since the integration of image acquisition capabilities with a mobile device allow for the sending and receiving of images on a mobile device. However, the prior art just enables the viewing of the images and does not enable the image to be endowed with different types of related information thus rendering the images of the prior an to have limited utility and no functionality that could be associated with the image and or launched by touching an entire image or a subset of an image such as a photo.

The present invention is intended to solve the problem enumerated above and other problems. The present invention describes and teaches a novel method for constructing image networks fir efficient and intelligent communication between one or more mobile devices, stationary devices, servers and individuals using images as a medium of communication with related device profiles and user profiles. The present invention additionally teaches novel mean for associating the image with one or more attributes and characteristics coupled with other forms of communication such as text, voice, data and other methods. The present invention in a novel manner leverages the ability to digitize all types of data inclusive of images, voice, text, data and other information enabling the establishment of relationships with the different types of data components coupled with the ability to use the mobile device by itself and one or more servers in conjunction with the mobile device to deliver unique and novel utility not offered by the prior art.

The image networks of the present invention are constructed enabling secure and trusted communication by means of encryption and other novel security features. Images by their very nature require the processing and storage of as large amount of digital data. Additionally, when an image is coupled with various types of other data such as text, voice, and digital data, the resulting combination requires significant real time processing and storage. The present invention teaches a novel method for enabling, the real time processing and storage of images by means of the mobile device acting by itself and or in conjunction with other mobile devices, and local, central and or network servers.

The present invention additionally teaches the system level means for associating the image of an animate or inanimate object with collateral information relating to the object acquired by one or more means inclusive of, image sensors, RF ID tags also known as radio frequency identification tags to enable intelligent image networks that are capable of being integrated into a larger digital network existing locally or on the Internet.

The present invention teaches the system for using the image that is displayed on a standard display or the image that is displayed on a touch sensitive display to be associated with various profiles relating to the image comprising of audio, voice, text, data, function and other information; further providing the means for actuation and control of functions at applications based on images and or subsets of the images being displayed.

BRIEF SUMMARY OF THE INVENTION

It is an object of the present invention to enable image based communication between mobile devices, stationary devices, and servers by wired or wireless communication means.

It is an object of the present invention to enable the construction and implementation of virtual image based networks.

It is an object of the present invention to enable images to be associated inherently or by specific selection with one or more other methods of communication such as text, voice, audio, data and other forms.

It is an object of the present invention to enable image networks to be composed of a series of images to form a video with the explicit intention that the definition and the use of the ten image networks is inclusive of various types of photos, graphics, still images and video rendered one at a time or sequentially and continuously.

It is an object of the present invention to define the acquisition means of the image to include by means of light in various wave lengths, inclusive of methods such as night vision spectra and other electromagnetic means.

It is an object of the present invention to enable the image by itself to be processed a digital data and combined selectively or inherently with other forms of digital data such as text, voice, audio, data and other forms to form one composite resultant entity for the desired utility in an image network.

It is an object of the present invention to encode, decode, compress, decompress the digitized image data by itself with various methods for encryption, decryption, compression and decompression that are best suited for each type of images or subset of an image to enable secure and efficient communication.

It is an object of the present invention to encode and decode the digitized text, voice, audio and other data by themselves and or in combination with various methods for encryption, decryption, compression and decompression that are best suited for each form and type of data to enable secure and efficient communication It is an object of the present invention to enable a unique encryption and compression key to be associated with the image and the other data associated with the specific image, sub set of the image or the specific image network that the image is part of by means of the mobile device acting by itself and or in conjunction with the central server acting as a trusted escrow server.

It is an object of the present invention to enable a unique decryption and decompression key to be associated with the image and the other data associated with the specific image, subset of the image or the specific image network that the image is part of by means of the mobile device acting by itself and or in conjunction with the central server acting as a trusted escrow server.

It is an object of the present invention to enable a unique encryption, decryption, compression and decompression keys to be associated with the image and the other data associated with the specific image, subset of the image or the specific image network that the image is part of by means of one or more mobile devices directly exchanging the keys for a specific image based communication with said keys being enabled for a specific purpose, at a specific time or for a specific duration.

Yet another object of the present invention teaches the system level means for associating the image of an animate or inanimate object with collateral information relating to the object acquired by one or more wired or wireless means inclusive of, image sensors and RF ID tags also known as radio frequency identification tags to enable intelligent image networks that are capable of being integrated into a larger digital network existing, locally or on the Internet.

Another object of the invention is to enable an image to be dynamically constructed and or deconstructed as a virtual digital image entity by software means of the image itself and or in association with other related parameters such as voice, text, data and other related information.

Another object of the invention is to enable a digital image entity to be dynamically constructed and deconstructed such that the digital image entity comes into existence at a specified time, exists for a desired duration of time and ceases to exist at a set time, with the additional features of being launched for a specific purpose.

Another object of the invention is to enable a digital image entity to be dynamically constructed and deconstructed such that the digital image entity is transformed by one or more algorithms to another digital image entity based on factors such as the security levels, the physical networks being traversed, the specific mobile devices being used and the individuals using the specific mobile device.

Another object of the invention is to enable a digital image entity to be characterized by form and function wherein the image entity conveys descriptive attributes and or executable functions resulting in the desired actions being actuated, wherein such actions specifically relate to the entire image entity and or sub image entities comprising of the entire image entity.

Another object of the invention is to enable a digital image entity to be characterized by form and function wherein the image entity consists of executable functions which may be actuated by pen based touch, finger based touch, voice, audio, sound, speech, light or other pointer means actuation methods by wired or wireless communication means to deliver the desired output such as audio, video and text, voice and speech in one or more languages.

Another object of the invention is to enable a digital image entity or an entire image network to be propagated across a network of mobile devices, stationary devices and servers to one or more selected mobile devices at the desired time and in the desired sequence, wherein such propagation of the image entity or the image network causes the image network existing on the mobile device prior to the propagation to be updated instantaneously or at the desired time.

Another object of the invention is to enable as digital image entity or an entire image network to be propagated across a network of users based on the profiles of the user, at the desired time and in the desired sequence to cause one or more social, professional, personal or other networks of the user to be updated.

Another object of the invention is to enable a digital image entity a subset of an image entity or an entire network of images to be propagated across a network of intelligent devices and display devices such a computer, TV, monitor or other devices based on the profiles of the mobile devices and or the user, at the desired time and in the desired sequence for the desired utility.

Another objective is to enable a display for a TV or monitor or a display for mobile devices to be configured for high definition quality by enabling images to be viewed as image entities and or the entire screen or portion of the screen to be modified and or controlled in a granular manner.

Another objective is to enable the screen image as an image network that is as a network or image entities for the provision of better quality multimedia experience.

Another objective is to enable control, actuation of functions by touching, a specific portions of the screen or subsets of the screen to launch one or more applications and or control functions and or actuation functions related to other intelligent devices.

Other objects, features and advantages of the present invention will become apparent from the following detailed description when taken in conjunction with the accompanying drawings.

BRIEF DESCRIPTION OF THE SEVERAL
VIEWS OF THE DRAWINGS

The accompanying drawings being incorporated in and forming a part of this specification, illustrate embodiments of the invention and together with the description serve to explain the principles of the present invention:

FIG. 1 shows a mobile device comprising of a plurality of device profiles and user profiles with the capability to acquire images and related information capability to recognize the images and compare the images, and the capability to send, receive, process and store by wired or wireless communication means. The image further being described as a virtual image entity by software means wherein the image entity comprises of an image profile that associates the image with collateral information such as audio, voice, text, speech, location, time data, handwriting, encryption/decryption, compression/decompression, description, behavior, function and relationships to other images/objects to form an image profile.

FIG. 2 shows a network of image entities that are virtually connected to each other by software means. Each of the images entities are described as having a relationship to the other enabling an intelligent image network to be constructed.

FIG. 3 shows an enlarged image network comprising of one or more image entities connected together defined by a virtual relationship. Each image entity each further comprises of one or more sub image entities that are connected to a specific image entity by their own sub relationships. This figure shows a hierarchical relationship of an image entity to sub image entities, showing an image network within an image network.

FIG. 4 shows an even more extended and enlarged image network forming a super image network, comprising of one or more super image entities being connected together defined by a virtual relationship between the super images. Each super image entity further comprises of one or more image entities that form an image network wherein each image network comprises of sub image entities forming a sub image network.

FIG. 5 shows a cellular telephone/mobile device. CT/MD, configured with image acquisition capabilities such as by means of as built in or external camera, means for wired or wireless communication by transmit/receive functions, means for display, said display being touch screen or non-touch screen enabled. The mobile device is part of a physical network formed by an image switch/router, servers, intelligent devices and sensors having the ability to communicate with a people network, a device network, an object network, and an image network.

DETAILED DESCRIPTION OF THE INVENTION

These features and other novel features are described in detail to further illustrate and explain with reference to the appended figures.

Figure 1:
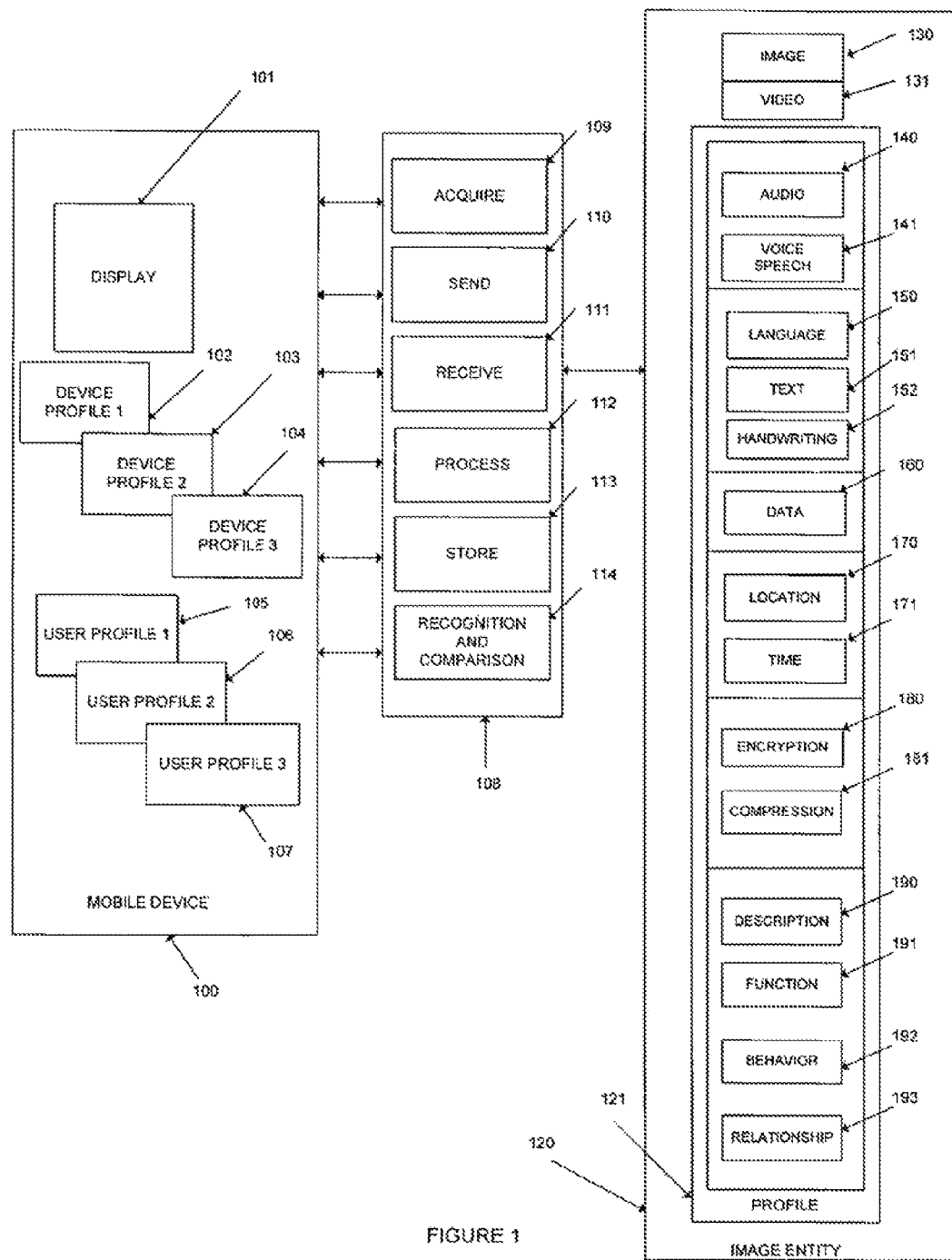

Referring now to FIG. 1 in detail, describes a mobile device 100 configured with standard features and or additional special features that define and enable the functionality of cell phones, laptop computers, personal digital assistant PDA, and other mobile devices. The mobile device 100 is configured with a display 101 which may be touch sensitive or alternately not touch sensitive. The mobile device 100 may be configured with a plurality of display windows and display types. The mobile device is characterized by one or more device profiles, 102, 103 and 104. The device profile comprising of information such as device model, device identification number, one or more mobile telephone numbers to empower the user to program and or select the desired device profile for the desired purpose and at the desired time. The mobile device user is further enabled to establish, modify and enable a plurality of user profiles, 105, 106 and 107 for use by itself and or in conjunction with the selected device profiles for the desired purpose.

The mobile device is enabled with the capability to acquire images by built in camera or external means 109, send 110, receive 111, process with a built in processor 112, store information locally 113, recognize and compare image and other patterns 114, with the composite functions being represented by 108 for providing the needed functionality for wired or wireless communication of images and other information.

The image entity 120 describes the relationship between the image 130, and video 131 and other collateral and associated information which is defined as an image profile 121. The image profile 121, comprises of audio 140, voice/speech 141, language 150, text 151, handwriting 152, data 160, location 170, time 171, encryption 180, compression 181, description 190, function 191, behavior 192 and relationship 193.

The image 130 and video 131 can be expressed as purely digital data and all of the other information associated with the image profile 121 may also be represented as purely digital data. The digital rendering of the composite data creates a purely digital image entity 120 comprising of an image and an image profile. Thus an image entity can be efficiently communicated across a wired or wireless physical network, received and sent and further processed for the desired utility to form a virtual network composed of images and associated image profiles. As an example an image entity can be viewed just as an image only or activated to deliver voice, music or other functions by selecting the functionality by appropriate interface means such as touching a portion of the image by voice command and or other means.

Efficient communication is achieved through compression and decompression as may be appropriate at the send or receive side of a device in the physical network. The conversion of voice, speech, text and handwriting is enabled by digital processing of the data at the mobile device level, the local server level, the central server level, the network server level and or the network server level to provide enhanced utility to the mobile device user based on mobile device profiles and or user profiles. The behavior of an image by itself and or in relation to other images is capable of being modeled. The dynamic construction storage and use of a virtual image entity is enabled by software means using the software, processing power/databases/lookup-tables resident within the mobile device and or in conjunction with the software, processing power/databases/lookup-tables resident in a physical network at the local, central, escrow and or the network server by fully leveraging the wired or wireless connectivity.

In the present system a plurality of device profiles and user profiles, with the capability to acquire images and related information by mobile device means, capability to recognize the images and compare the images and the capability to send, receive, process and store by wired or wireless communication means is described. The image further being described as a virtual image entity by software means wherein the image entity comprises of an image profile that associates the image with collateral information such as audio, voice, text, speech, location, time data, handwriting, encryption/decryption, compression/decompression, description, behavior, function and relationships to other images/objects to form an image profile.

An image entity thus is unitized as a distinct and identifiable digital entity, said unitized image entity having embedded multimedia capabilities, location, security and executable functions that are inherently associated with the image with the added ability to launch the desired multimedia method for rendering and or actuating a desired virtual or physical function. The unitized digital image entities are linked together to form an image network with the ability to send the selected unitized image entity across a physical network or across one virtual image network to another and or propagate an entire image network across a physical network to a mobile devices, servers and other devices for delivering utility to the user based on device/user profiles. The linking of image entities to film an image network is relationship based, where the user defines the relationship or the relationship is learnt by software means based on the past user behavior patterns and potential user behavior patterns.

A mobile device is enabled in the present invention to digitize and unitize an image entity by means of the software/processing power, storage/databases/lookup-tables resident on the mobile device and or in conjunction with the software/processing power storage/databases/lookup-tables resident on the local central, escrow and or network servers leveraging the high speed wired or wireless connectivity between mobile devices and stationary devices. Currently, transmission across a digital network is by means of digital packets. The image entity is composed of digital data packets. However, these packets of digital data have a pre-existing relationship in the form of an image entity that is digitized and unitized. The image entity may be described as a supersized packet of digital data enabling the transmission of image entities efficiently across a network to dynamically construct/deconstruct and switch and rout image entities in an image network.

Figure 2:
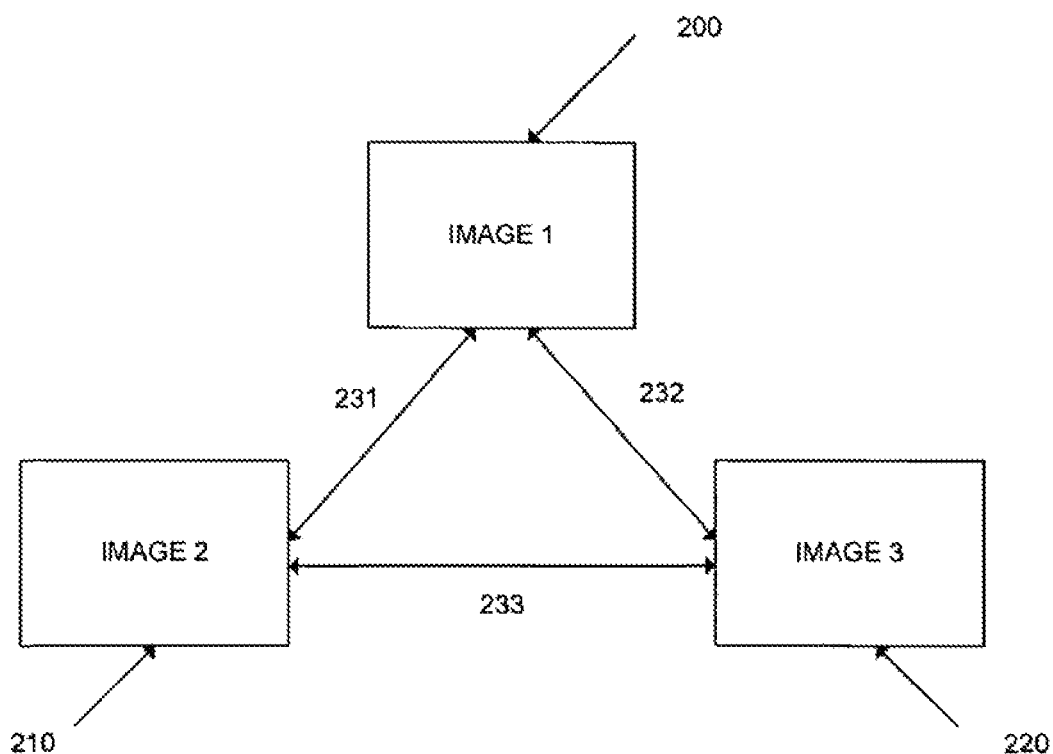

Referring now to FIG. 2 in detail, the image entity 200, the image entity 210 and the image entity 230 form a basic image network wherein the image entities are virtually connected by means of the relationship 231, 232 and 233. The relationship between image entities is defined and executed in software which is resident on the mobile device and or the servers. The relationship data is further stored in lookup-tables for enabling dynamic lookup of a relationship between images for providing efficient routing and delivery of the image and the image profile across an image network.

Figure 3:
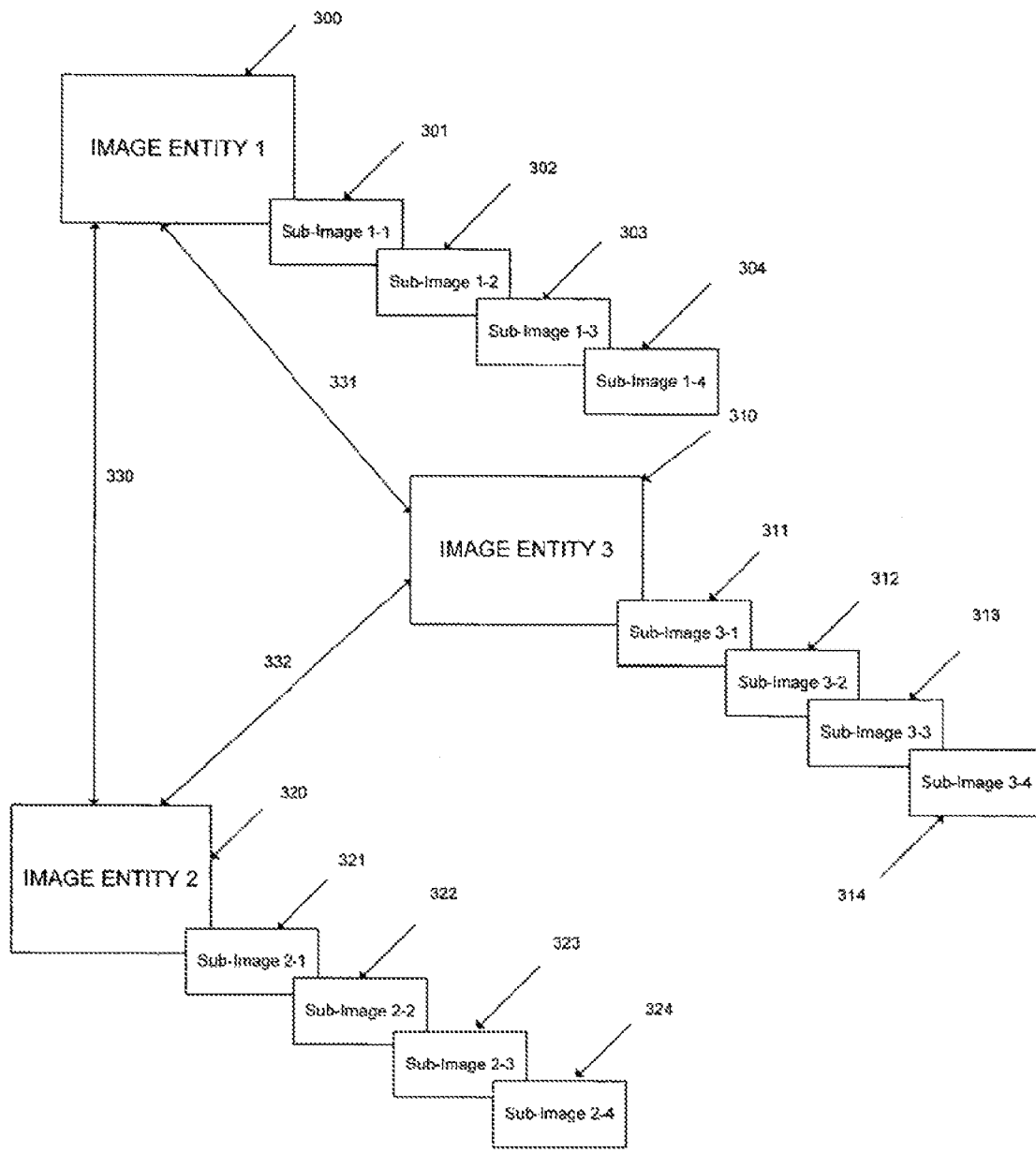

Referring now to FIG. 3 in detail, a plurality of image entities, 300, 310 and 330 comprise an image network with defined relationships 330, 331 and 332 which describe the detailed and specific relationships between each image entity. The image entity 300 comprises of sub image entities 301, 302, 303, and 304 that share a relationship with each other in addition to the parent image entity 300. The image entity 310 comprises of a set of constituent sub image entities that are labeled as 311, 312, 313, and 314. These sub-image entities share a relationship to portions of the larger image entity 310. The image entity 320 comprises of a set of constituent sub image entities 321, 322, 323, and 324. These sub image entities derive properties from sections of the larger image entity 320 and include certain attributes and parameters that are not explicitly part of image 320.

Figure 4:
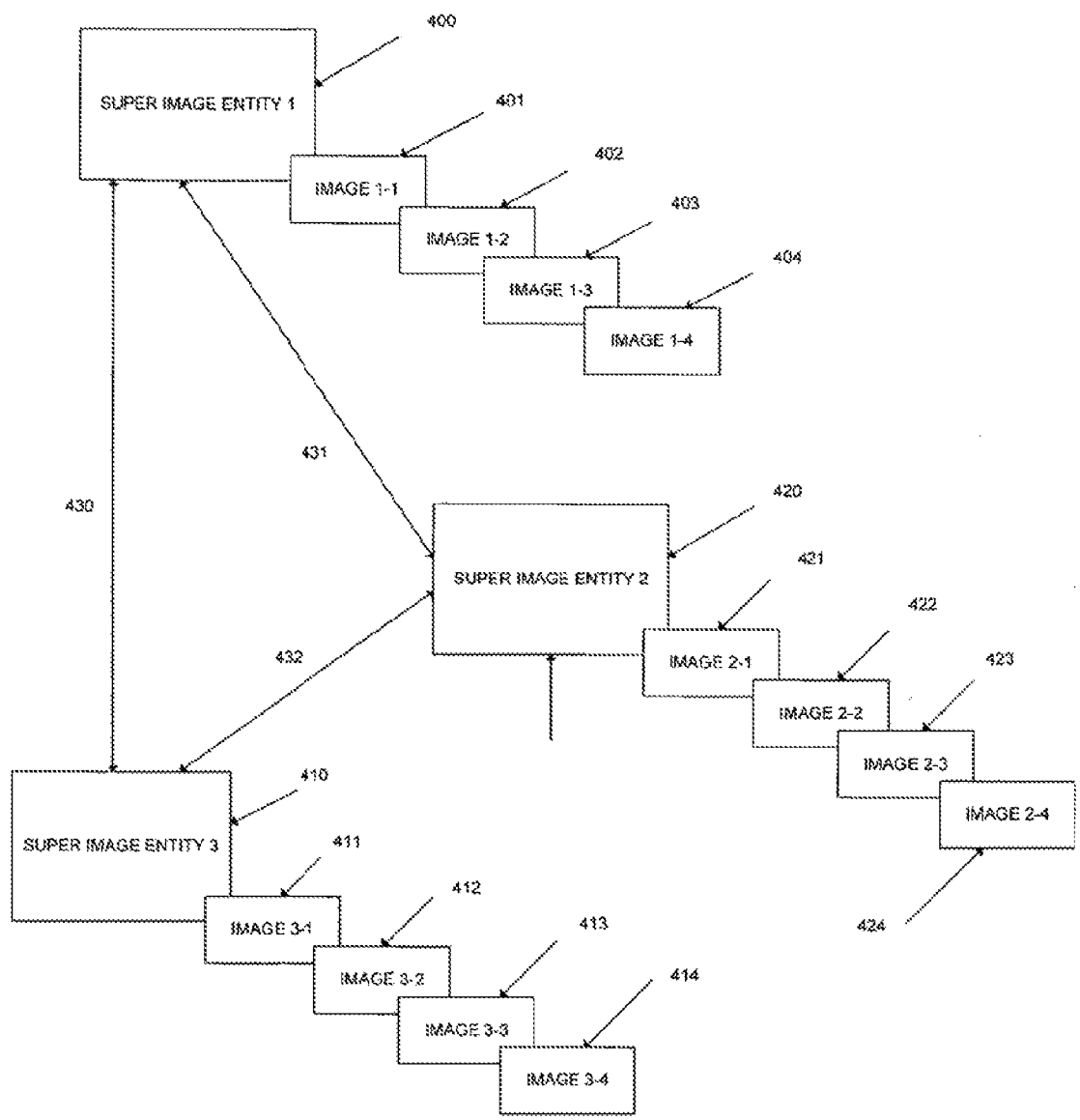

Referring now to FIG. 4 in detail, a plurality of super image entities, 400, 410, 420 comprise an image network with defined relationships 430, 431, and 432. The super image entity 400 maintains relationships with image entities 401, 402, 403, and 404. The relationship between image entity 400 and 402 is determined by the relationship between image entity 400 and 401 and the relationship between image entity 401 and 402 and or other combinations. The image entity 420 and 430 may maintain similar or other types of serial, combinational and or hierarchical relationships with their respective constituent images.

Further referring now to both FIG. 3 and FIG. 4, the foregoing architecture, system of organizing and establishing virtual relationships between various super image entities, image entities and sub image entities enables the dynamic construction of highly useful and relevant image networks. The software for constructing, deconstructing, modifying and enabling of the image networks may be reside within the mobile device and or the servers with specific protocols and complex algorithms being employed using the processing power and data bases of one or more mobile devices by itself, in combination and or in conjunction with a local, central, escrow and or network server. The image network may be transformed or modified automatically, based on device and user profiles and rendered for a specific purpose and or for a specific duration with the desired security levels. The security key for a virtual image network may be dynamically enabled by a mobile device acting alone and or in conjunction with an escrow server.

Figure 5:
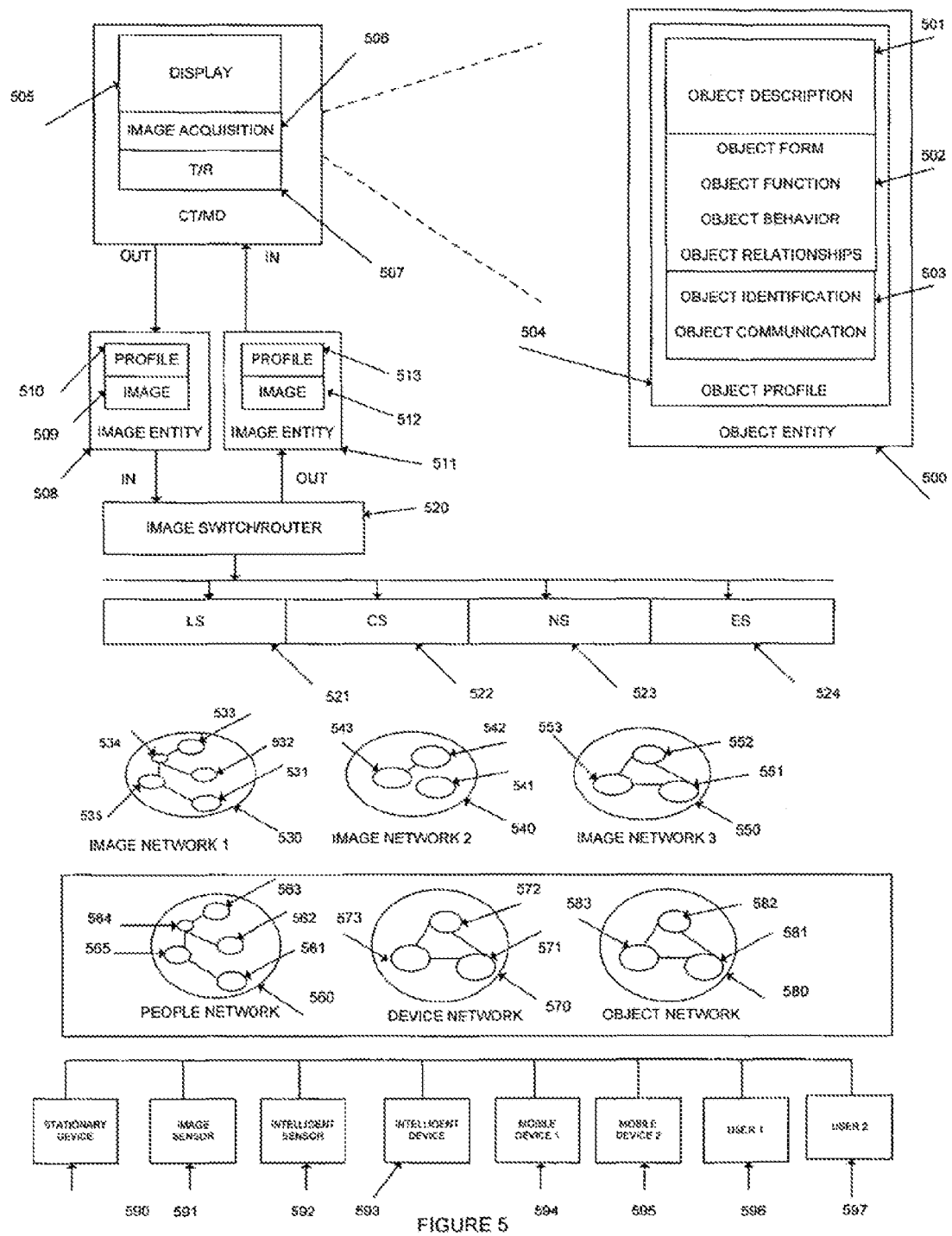

Referring now to FIG. 5 in detail, the mobile device represented by the legend CT/MD and comprises of one or more display windows and display types inclusive of a touch screen enabled display 505, an image acquisition unit such as a built in or external camera 506, a transmit/receive unit for enabling wired or wireless communication 507. The mobile device acquires the image of an object dynamically and in real time. The object entity 500, describes the object in detail by means of an object profile 504. The object profile comprises of object description 501, object form, object function, object behavior, object relationships together represented as a group 502 and the object identification and object communication together represented as 503. Additionally, the object may be identified by one or more identification methods inclusive of radio frequency enabled tags and embedded chips that enable either one way or two way communication between the object, the mobile device and or the servers. Another method of object identification and communication is by sound based methods wherein an audible signal is emitted or received. The RF and or other methods enable specific digital information to be transmitted and or received. The present invention enables the integration and intelligent combination of the object identification object profile data rendered in digital form to be associated with an object, object network, an image and an image network.

Referring once again to FIG. 5 in detail, the mobile device is configured to create and output and send by wired or wireless means an image entity 508 comprising of an image 509 and an associated image profile 510. The image entity may be transmitted by wired or wireless means to an image switch/router 520, further processed within the image switch/router and sent across the physical network to a local server 521, central server 522, escrow server 524 and or a network server 523; or to other mobile devices 594/user 596 and mobile device 595/user 597 stationary device 590, image sensor 591, intelligent sensor 592 and intelligent device 593. The image sensor is enabled for acquiring and transmitting/receiving image providing a real time response to actual image, change in images and other related information wherein the information may be rendered as an image entity by the image switch, the mobile device, the servers and or the image sensor itself.

The mobile device user by means of the mobile device is enabled to dynamically construct and deconstruct various types of image networks 530, for the desired utility and associate these networks with a desired user profile and or a mobile device profile. The image network comprises of constituent image entities 531, 532, 533, 534 and 535. Similarly another image network 540 and 550 may be constructed. Similarly a virtual object network 580 is enabled comprising of related objects and sub objects.

The utility of an image network is derived when the virtual image network is accessible by one or more mobile devices 573, 572, and 571 comprising a device network 570 which in turn is connected by wired or wireless means to other stationary devices, intelligent devices, intelligent sensors, image sensors, local servers, central servers, escrow servers, and network servers. The physical network thrilled in this manner enables the innovative software to be deployed at one or more devices/servers providing the means for constructing and implementing image networks by leveraging the processing power/databases/lookup-tables at the desired nodes in the physical network and or a combination of nodes in the network.

The utility to one or more individual users 596 and 597 is further enabled when the virtual image network is the either a preferred or necessary medium of communication between users because of ease of use. Additionally, individuals may form a virtual network of people joined together for a specific purpose such as social networks, professional networks, enterprise networks, family networks, friends networks and other networks. Such virtual people networks are represented by 560 with specific individuals and their relationships with each other being represented by 561, 562, 563, 564 and 565. Each user in such people networks has one or more profiles and is enabled to form multiple people networks. The present invention teaches the means for propagating an image entity to a specific device/user and or to a plurality of devices/user enabling the people networks to be a viable means for a rich and meaningful communication and interaction. An image entity or a series of image entities may be propagated to the desired devices/users at the desired time and for the desired purpose enabling image network based multimedia communication that is relevant in a highly interconnected digital world. Further the image entity is replicated and delivered and placed in specific nodes of one or more people networks of a user and or one or more people networks of a plurality of users.

Figure 6:
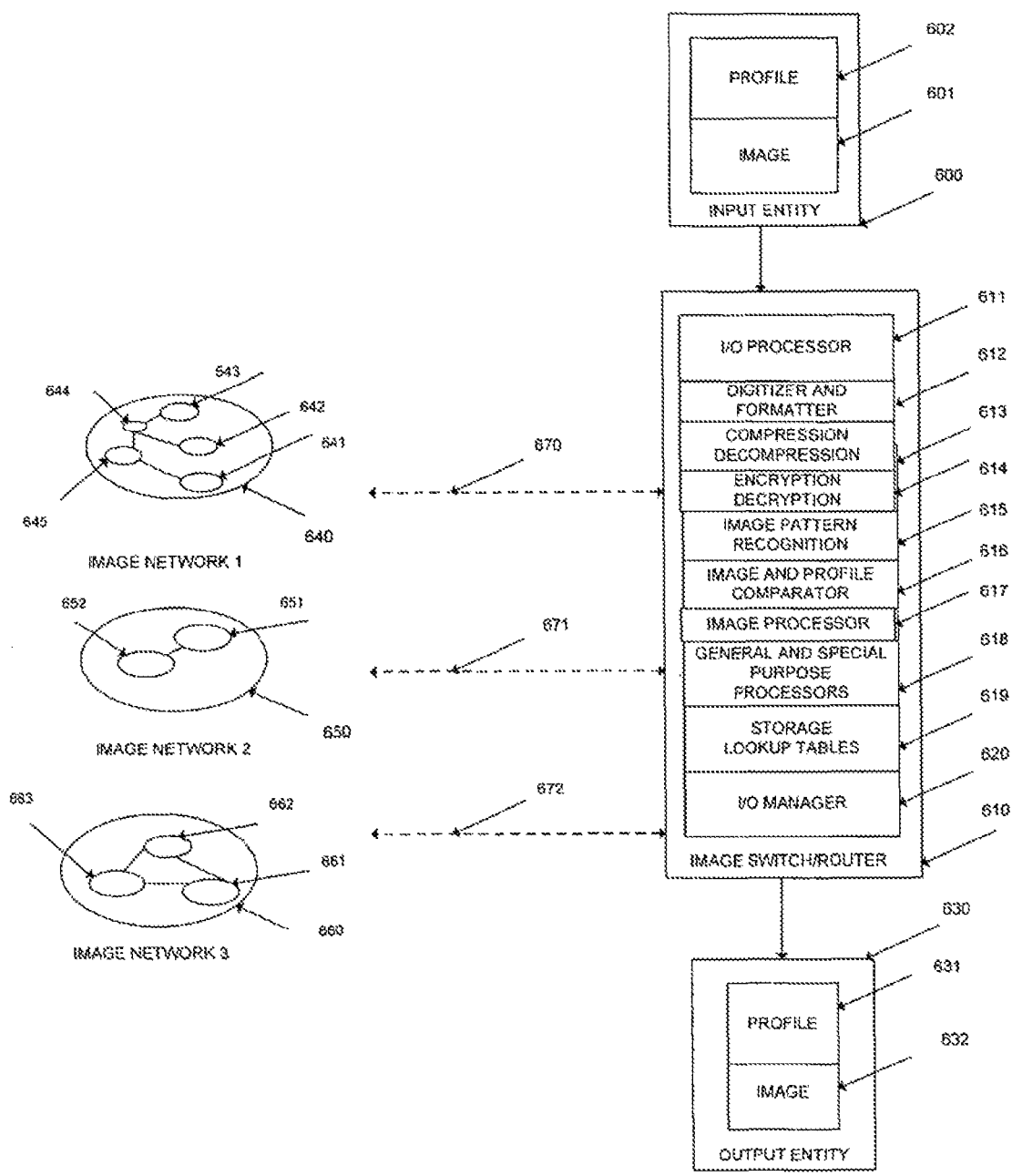
FIG. 6 shows a detailed view of an image switch/router wherein the image switch/router is capable of taking inputs of an image entity and outputting same or a transformed image entity for the construction of and communication with different nodes in an image network.

Referring now to FIG. 6 in detail, the Image Switch/Router 610 comprises of an 110 processor, 611 for the processing of image entities as inputs and outputs; a digitizer and formatter 612 to enable the inputs/outputs to be digitized as needed and formatted as needed for further processing/send/receive/storage. Means for encryption/decryption, 614 of outgoing image entities, wherein each image entity may be encrypted at one or more levels of security and various sub image entities may be encrypted at one or more different levels of security for providing granular security.

The image switch/router further comprising the capability for pattern recognition of images by the image processor, 615, a means for comparison of images and image profiles 616, a general purpose processor and one or more special purpose processors, 618 for processing audio and other digital signals, a means for storage and means for establishing lookup-tables, 619 and an 110 manager for enabling the desired switching and routing across a physical network or the virtual image network.

The inputs to the image switch/router consist of an image entity, 600 that thither comprises of an image, 601 and an image profile, 602. The outputs to the image switch/router consist of an image entity, 630 that further comprises of an image, 631 and an image profile, 632. The foregoing architecture is for illustrative purposes and the novel features of processing an image entity may be executed by software by a single processor and other modifications to form an image switch/router for switching and routing of images in an image network.

The image network, 640 comprising of sub image entities 641 through 645; the image network, 650 comprising of sub image entities 651 through 652 and the image network, 660 comprising of sub image entities 661 through 663 are virtual entities that exist on the network at one or more nodes and storage devices. The entire image network such as 640, 650 and 660 and or a specific image entity within these image individual image networks may be swapped from one network to another by image switching and routing; and or generally sent across a physical network to a physical device by means of routing tables/protocols 670, 671 and 672.

The novel system of the present invention thus enables an image to be linked with its associated profile, the profile further having audio, text, data and other information to form an image entity that is purely digital and virtual; enabling the image entities to be linked together by a user defined relationship to form a virtual image network which can be propagated across a physical network to a physical device for the desired display format and or further utility to the user based on device profiles and user profiles. The utility may be derived by visual means only and or coupled with other mediums such as voice, text and others since the image entity comprises of such collateral forms of information.

The actuation of the image entity may be executed by a plurality of interface methods to access the specific digital data individually and or in combination inclusive of the capability to launch an application that performs a specific function and or action, said functions and actions being virtually executed and or physically enabled. An example of this is by clicking on an image of a garage door the door may be opened or closed. Another example is the image entity may be associated virtually with another image entity. For example the image of a car, a car whose image is characterized and related to the home owner, that is approaching the garage from the outside may cause the garage door to open, since these two images are linked by a relationship that was previously defined and approved by the user. The garage door was physically opened in this example since the software caused a function to be executed. The behavior can also be learned based on user defined profiles. Thus image based networks of the present invention are of great utility and practical applications. An image based network by definition includes still images and video.

Figure 7:
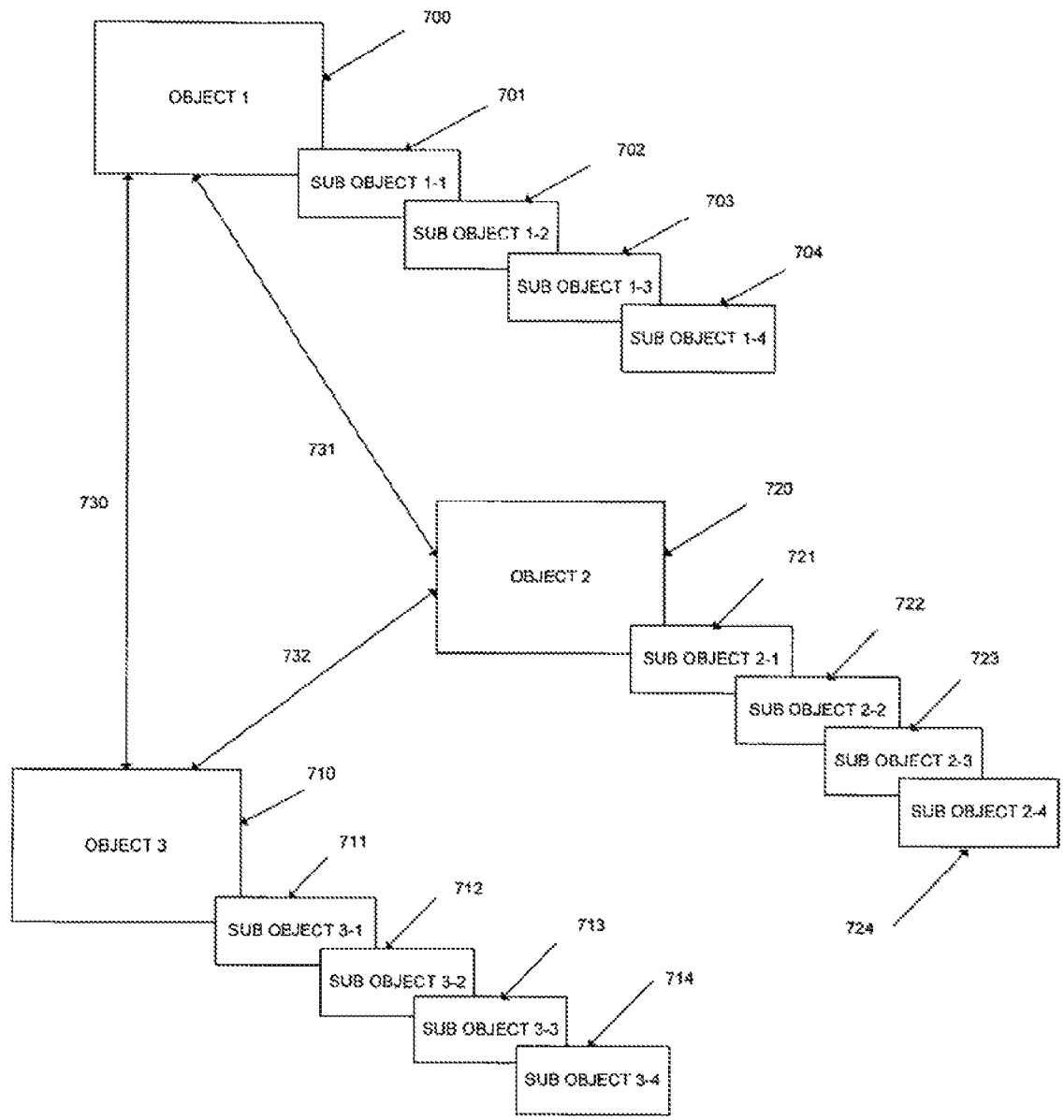
FIG. 7 shows a virtual object network described in software comprising of one or more objects wherein each object has a defined relationship to another. Additionally, each object is related to one or more sub-objects.

Referring now to FIG. 7 in detail, a plurality of objects, 700, 710 and 720 comprise an object network with defined relationships 730, 731 and 732 which describe the detailed and specific relationships between each object. This forms an object network describable in software as an object network. The object when coupled with its associated descriptions, identification, parameters and relationships is defined as an object entity. The object entity 700 comprises of sub object entities 701, 702, 703, and 704 that share a relationship with each other in addition to the parent image entity 700. An example of this is a side chair of a dining table ensemble with four legs wherein the chair and the legs of the chair have a defined relationship that may be described in software as an object sub-network. The image entity 710 comprises of a set of constituent sub object entities that are labeled as 711, 712, 713, and 714. These sub-image entities share a relationship to portions of the larger image entity 710. As an example this object sub-network may represent in software an arm chair within the same dining table-chair group. The image entity 720 comprises of a set of constituent sub image entities 721, 722, 723, and 724. These sub image entities derive properties from sections of the larger image entity 720 and include certain attributes and parameters that are not explicitly part of image 720. The object entities 700, 710 and 720 form an object network that is virtually defined by a software program. The object network may be linked to various real images of the different objects to enable a real visual representation forming a virtual image network that is of utility as explained elsewhere in the present teaching.

Figure 8:
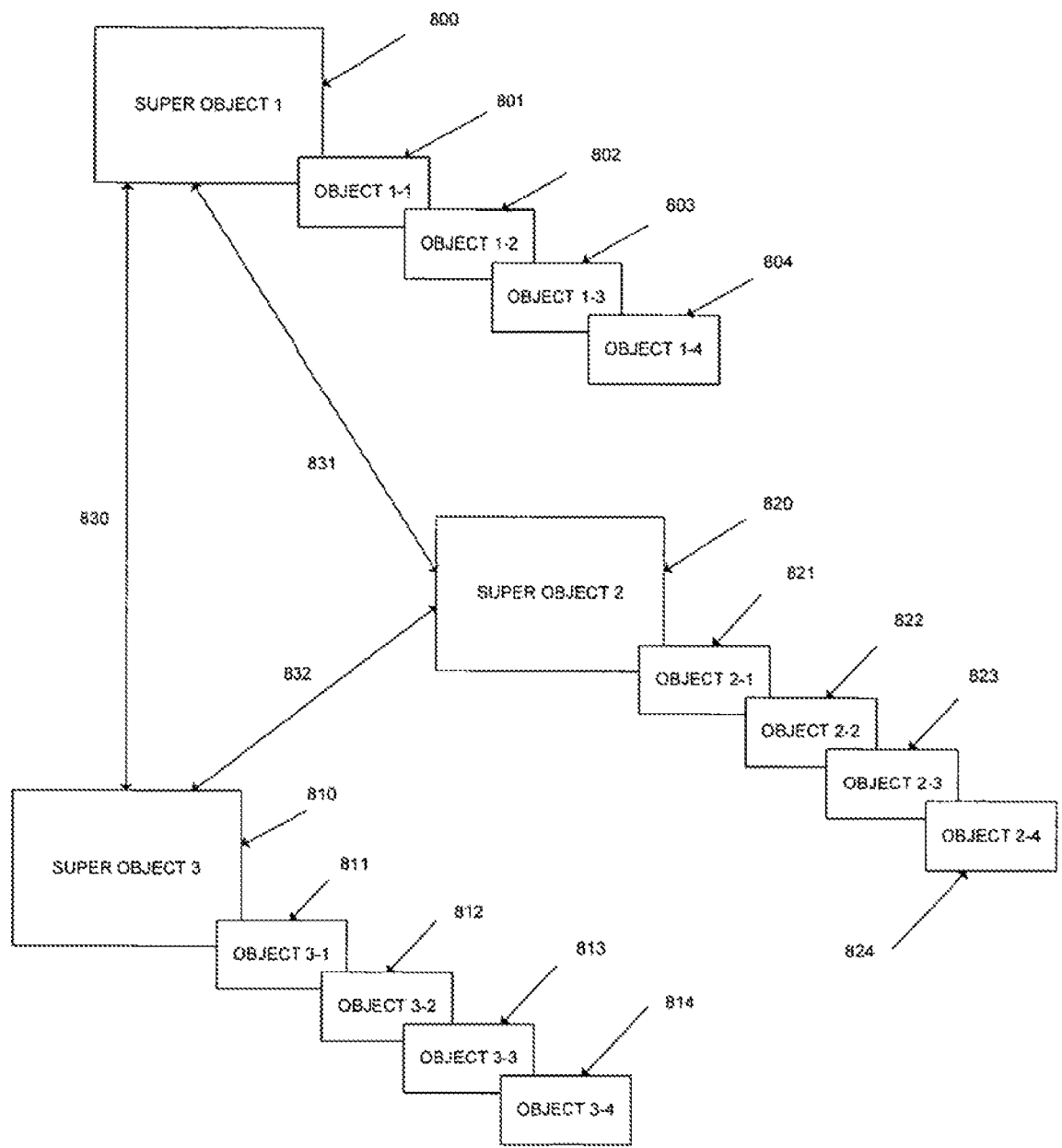
FIG. 8 shows a virtual super object network described in software comprising of a super object that comprises of one or more other but related objects.

Referring now to FIG. 8 in detail, a plurality of super object entities, 800, 810, 820 comprise an object network with defined relationships 830, 831, and 832. The super object entity 800 maintains relationships with object entities 801, 802, 803, and 804. The relationship between object entity 800 and 802 is determined by the relationship between object entity 800 and 801 and the relationship between object entity 801 and 802 and or other combinations. The object 820 and 830 may maintain similar or other types of serial, combinational and or hierarchical relationships with their respective constituent objects.

Further referring now to both FIG. 7 and FIG. 8, the foregoing architecture, system of organizing and establishing virtual relationships between various objects that may be animate or inanimate is of great utility especially when associated with a real image or a virtual computer generated image enabling the user to visualize, design and even actuate the desired function of an object or cause a desired transformation of form and function of a physical object by remote network access means. Ability to establish an intelligent relationship between super object entities, object entities and sub object entities enables the dynamic construction of highly useful and relevant object networks. The software for constructing, deconstructing, modifying and enabling of the object networks may be reside within the mobile device and or the servers with specific protocols and complex algorithms being employed using the processing power and data bases of one or more mobile devices by itself, in combination and or in conjunction with a local, central, escrow and or network server. The object network may be transformed or modified automatically, based on device and user profiles and rendered for a specific purpose and or for a specific duration with the desired security levels. The security key for a virtual object network may be dynamically enabled by a mobile device acting alone and or in conjunction with an escrow server. The object networks may be interrelated with the associated image network.

Figure 9:
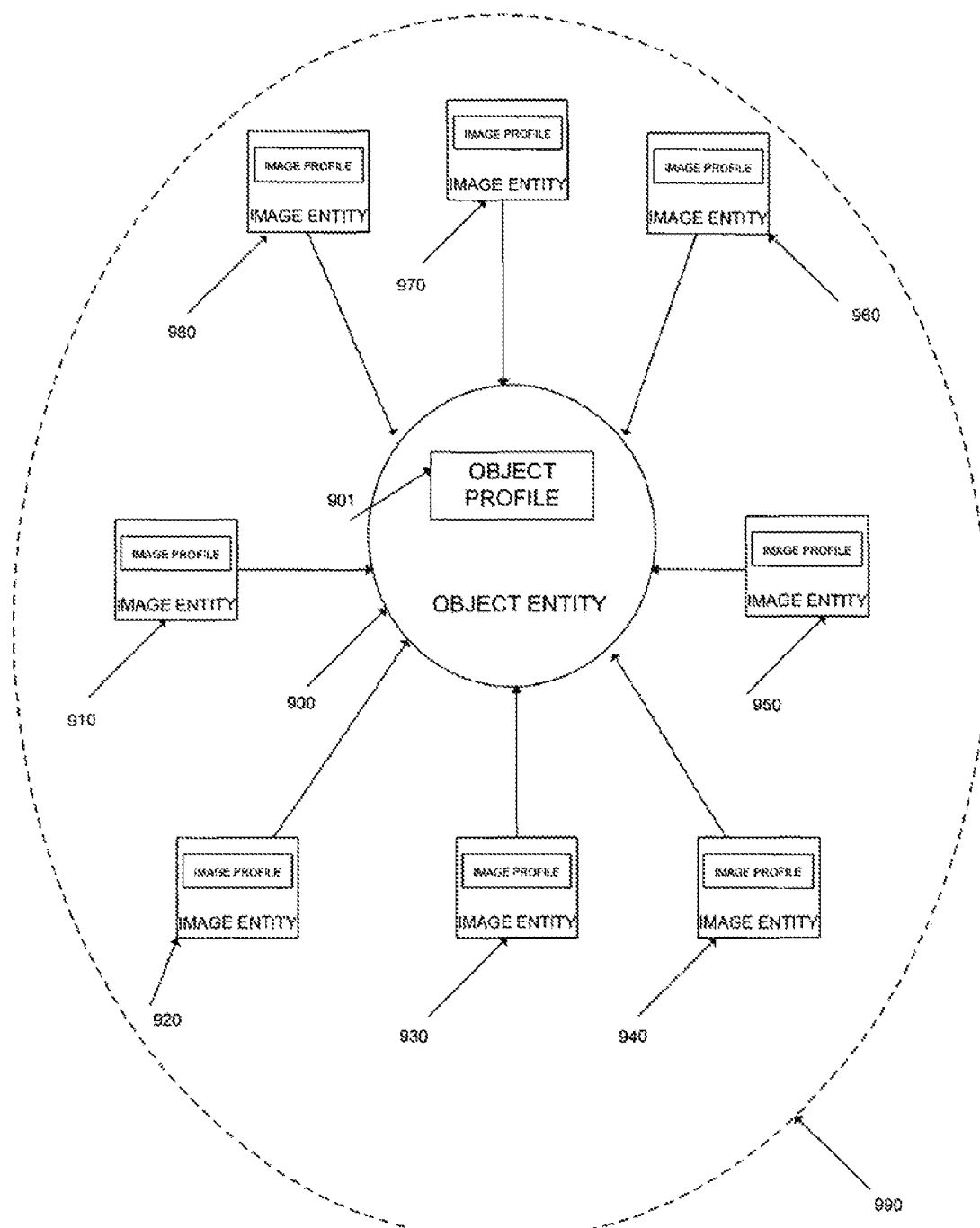
FIG. 9 shows an object entity that is defined as an object with an associated object profile. The figure further shows the 3 dimensional external view of the object with images being acquired from one or more spherical angles wherein an image entity is generated for each view.

Referring now to FIG. 9 in detail, an object may be viewed, from the outside from all 360 degrees of angle to present the best visual representation of its characteristics. At times it is not possible to obtain a full 360 degree view and a visual representation must be rendered by extrapolation means. A mobile device and or other devices may be used for image acquisition for obtaining a full or partial real and visual representation of the object. The object 900 with the associated object profile 901 forms an object entity. The object profile contains detailed information about the object such as object type, object identification by RF tag or other means, object relationships and other relevant information.

The object entity 900 may be viewed by a camera, image sensors or other image acquisition methods from all angles when physically possible to get an image with an associated image profile to form an image entity that best describes the object when viewed front that particular angle or vantage point. The Image entities 910, 920, 930, 940, 950, 960, 970 and 980 represent the view from different angles. The representation is intended to be 3D spherical and not two dimensional.

Example of an object that may be viewed from the outside is a home. In the event the full view from all angles is not possible due to lack of access, then it is possible by software means to extrapolate using various algorithms to render an image that is most representative. The ability to generate image entities with a mobile device and or other means is enabled, to represent an object and construct an object network and or an image network. The image network is represented as 990 showing an image network of all the images thus generated with their respective image profiles.

Figure 10:
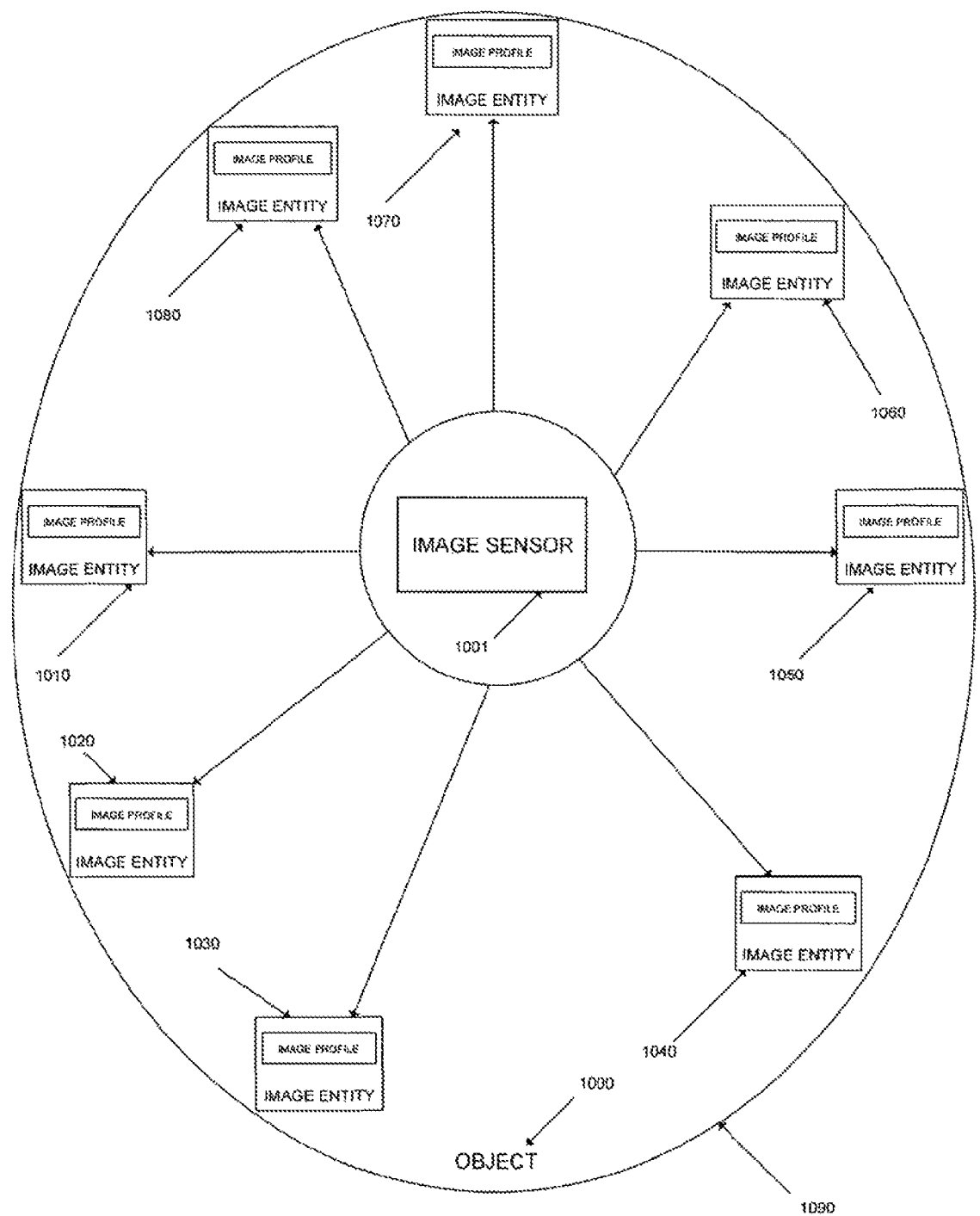
FIG. 10 shows the view of an object from an internal to the object perspective. The image sensor located internal to the object generates one or more image entities to form an image network that establishes a relationship that best describes the object.

Referring now to FIG. 10 in detail, an object may be viewed from the inside from all 360 degrees of angle to present the best visual representation of its characteristics. At times it is not possible to obtain a full 360 degree view and a visual representation must be rendered by extrapolation means. A mobile device, image sensor and or other devices may be used for image acquisition for obtaining a full or partial real and visual representation of the object. The object 1000 with the associated object profile forms a super object entity that is being represented from the inside. The mobile device, image sensor and or other means for image acquisition is represented by 1001.

The object entity 1000 may be viewed by a camera, image sensor or other image acquisition methods from all angles when physically possible to get an image with an associated image profile to form an image entity that best describes the object when viewed from that particular inside angle or vantage point. The Image entities 1010, 1020, 1030, 1040, 1050, 1060, 1070 and 1080 represent the view from different angles. The representation is intended to be 3D spherical and not two dimensional. The image network is represented as 1090 showing an image network of all the images thus generated from the inside with their respective image profiles.

The image networks generated from the inside and or the outside represent the object enabling these virtual image networks to be stored, further processed or sent to the desired mobile device, stationary device and or the servers in a physical network. The ability to construct/deconstruction modify/store and generally render the image networks to be useful is enabled by means of the mobile device acting by itself and or in conjunction with other mobile devices, sensors and servers leveraging the software, processing, power, storage, databases, lookup-tables and wired or wireless connectivity in a desired manner by the user at the desired node in a physical network. The image acquisition may be means of light in any wavelength, by sound, by electromagnetic means such as RF and other methods.

Each physical object and subsets of an object may be uniquely identified and represented by a plurality of characteristics, relationships and behavior patterns. The identification of an object and or subsets of an object may be by attached or embedded RF tags or chips wherein the tags and chips contain the relevant information such as form, function, colors, size, relationships and other parameters. Additionally sound based methods may be used for location determination in an environment. Location may be determined by GPS, global positioning means. The ability to time stamp and location stamp the original object entity definition coupled with the precise location and time of the construction of an object network is enabled. The objects transmit/receive data by means of the communication tags/chips enabling the data to be characterized and enabling placement of the object entity in a virtual object network. The construction, deconstruction, modification and storage of the object network is also time stamped, location stamped and author stamped by software means. Similarly, the original definition of the virtual image entity is, author, time and location stamped by software means. The placement of each image entity in a virtual image network is also author, time and location stamped by software means enabling the discovery trail of one or more actions. The construction, deconstruction, modification and storage of the image network is also time stamped, location stamped and author stamped by software means.

The object may be defined as an object entity with a plurality of object profiles or no object profile. The object network may be defined with a plurality of object network profiles or no object network profiles. The image may be defined as an image entity with a plurality of image profiles or no image profile. The image network may be defined with a plurality of image network profiles or no image network profiles. The for going teaches the means for object and image networks to be enabled dynamically and in real time.

Figure 11:
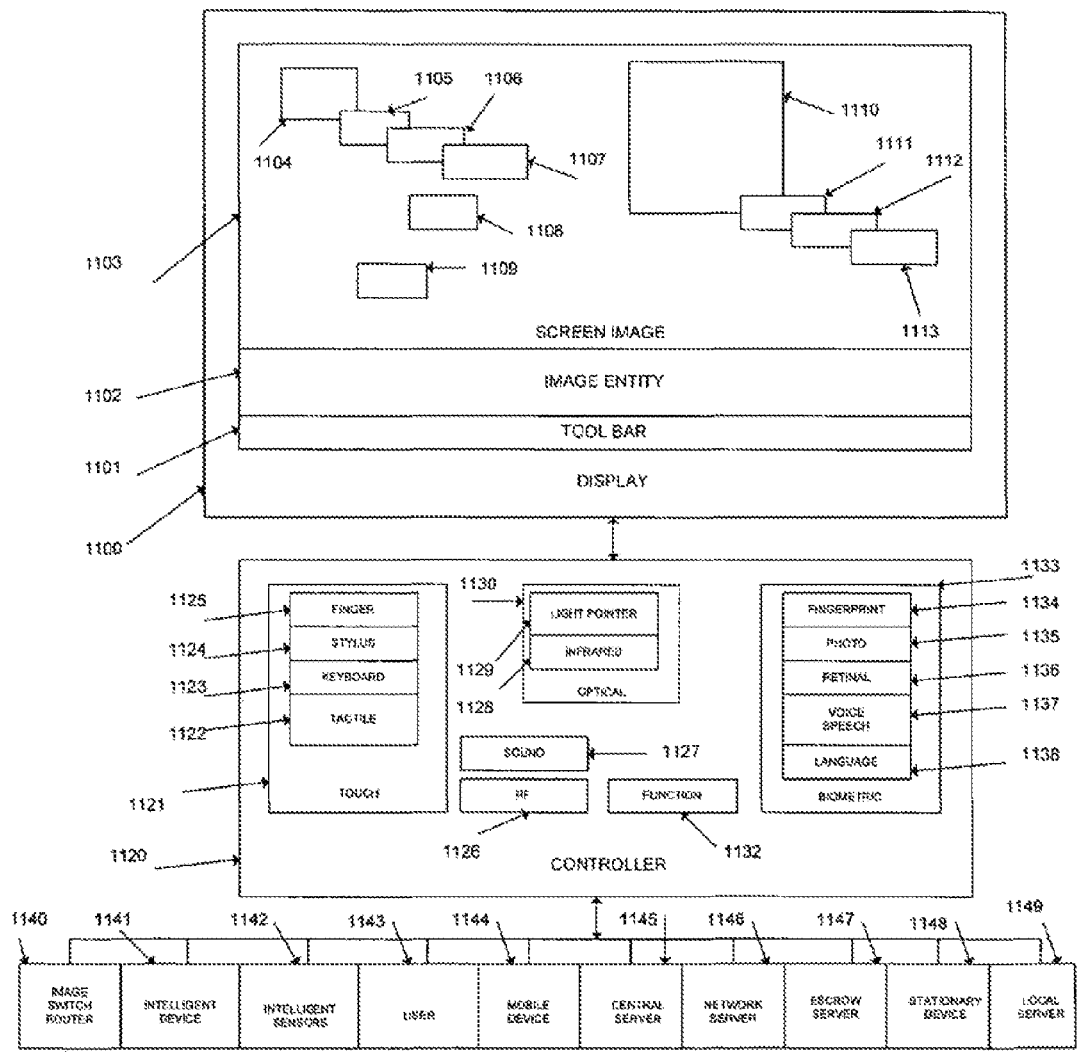
FIG. 11 shows a network composed of mobile devices/users, local, central, network and escrow servers, image switch router, a controller that enables actuation and functionality by a plurality of interface methods, and a touch screen or non-touch screen display that comprises of a tool bar. Various image entities are enabled for display.

Referring now to FIG. 11 in detail, the physical network located locally or on an extended network or the Internet with wired or wireless communication capabilities comprises of an Image switch router 1140 for enabling the switching and routing, of image entities and image networks, an intelligent device 1141 such as a TV and other devices, an intelligent sensor 1142 for sensing and transmitting/receiving one or more conditions such as images, temperature, radiation levels and other conditions, one or mobile devices 1144, one or more users 1143, central server 1145, network server 1146, escrow server 1147, stationary device 1148 and local server 1149.

The controller 1120 may be a remote controller or a mobile device that performs the additional functions of the controller in an image network and or a standard non image network. The mobile device may be configured to perform the functions of a controller 1120 by itself and or in conjunction with the processing power of the local, central, escrow, the network server and the image switch/router. Alternately some or all of the functions of the controller may be incorporated in one or more devices and the display. The controller comprises of different types of actuation, command, control and function enabling features and serves as a means for interfacing with one or more devices, servers and the display. The controller function may be embedded in a mobile device.

One type of interface is by means of touch 1121 further comprising of tactile 1122, keyboard 1123, pen or stylus 1124, and finger 1125. Another type of interlace may be by optical means 1130 inclusive of light pointer 1129, infrared 1128 and other types of laser and optical methods, wherein the act of pointing at an image activates the image entity and launches an application. In addition another interface means is sound based 1127 by one or more methods. Another type of interface and command and control is by RF means, 1126. The image entity or the image network is enabled to execute certain desired functions by the appropriate command and control interface methods by means of the function selector 1132.

The biometric command, control and authentication features 1133 are enabled by means of fingerprint 1134, photo identification 1135, retinal scan means 1136 and speech/voice recognition means 1137 with language translation 1138. The controller function is enabled by wired or wireless methods of communication. The controller enables a high degree of personalization to the profiles of different devices and users with the added capability for behavior modeling and response by means of the processing capability of the controller by itself and or in conjunction with a local, central, escrow and network server. The escrow server or the central server performs trusted authentication for a desired action or activity related to any network or any function thus providing a high level of security to the user and the integrity of the network.

The display 1100 may be a standard non touch screen display such a CRT, plasma, LCD or other methods. The display may be touch screen enabled. The display may comprise of one or more physical or virtual display areas for the desired utility. Different windows are enabled within the display of same or different types of interface.

The display is pan of the physical network enabled for communication by wired or wireless means with other devices. Another novel embodiment of the present invention, the display is configured with one or more processors, storage, databases, lookup-tables and software to enable dynamic adjustments of the entire display area and or the adjustments of any localized area down to the pixel level for delivering images, image networks and video to the personalized viewing preference of the user.

In another novel embodiment of the present invention, the display configuration and settings may be learned to the behavior patterns of the user for a specific type of image, image networks and video. In another embodiment of the present invention the spatial distortions across the display area, the aberrations in color and intensity of different images is also dynamically managed by local processing within the display and or in conjunction with the tremendous processing power of one or more servers. These features are dynamically and in real time enabled by means of the software, processing power, storage, databases and lookup-tables resident on the display itself and or in conjunction with the software, processing power, storage, databases and lookup-tables resident on the mobile device, controller, local, central, escrow and or network server.

Referring to FIG. 11 in detail once again, the display area is configured with an optional tool bar 1101. The tool bar is actuated by one or more interface methods as described with reference to the controller 1120. The tool bar as an example may be activated by voice, speech, light pointer, touch and other means as preferred and selected by the user for close-up or remote activation by means of the controller, mobile device or another device. The tool bar is enabled to launch and activate one or more applications such as show an image, play video, audio, music and or launch a command and control function such as see what is in the refrigerator and display the contents of the networked intelligent refrigerator or other intelligent devices. The tool bar is further enabled to launch one or more functions to access web servers located on the Internet and or servers located on the Intranet, for surfing, content and or other activities. The tool bar is capable of performing the functions of a traditional Internet browser of the prior art and other enhanced functions and being, activated by multimedia command and control features.

The display configuration described in the embodiment of the present invention is all digital communication and processing enabled and relates to mobile devices and also stationary intelligent devices such as a Television or a monitor to provide a very high definition and high fidelity multimedia experience.

Referring to FIG. 11 once more in detail, the images and their associated image profiles form an image entity rendered digitally as a unique entity. The display is configured to show a series of images only or image entities separately or as an image network. As an example the entire display area is denoted by the image entity 1102, and the actual image being displayed is denoted by Screen image 1103. The viewer sees the super image which gets updated periodically with another super image at the desired rate for best visual experience. The visual experience is formed by viewing a series of super images that are refreshed and updated at an optimal frequency. As an example the image entity 1104 comprises of a series of sub image entities 1105, 1106 and 1107 with a defined relationship to the image entity 1104. The image entities 1108 and 1109 are shown separately as being part of screen image 1103. Another super image entity 1110 comprising of image entities and sub image entities 1111, 1112 and 113 are shown. These features are shown for illustrative purpose whereas in reality the screen image is comprised of a large number of image entities of varying sizes and characteristics with a defined relationship to each other and another defined relationship to the screen image. These images are dynamically rendered, delivered, modified and updated to deliver the best screen image. The screen image is by this means configured as an image network that gets updated at the desired periodicity. Be control over the viewing experience is achieved by enabling granular control over image entities in this image network wherein the image entities may also be updated at the desired periodicity or desired attributes. This feature enables the screen image or portions of the screen image to be dynamically tuned for the preferences of the user. The granular control of delivering image entities efficiently makes the quality superior. Additionally, the image entities may be modified to it the desires and viewing experience of the user. The ability to do these transformations in real time is enabled by means of the software, processing power, databases and lookup-tables resident within the display and or in conjunction with the software, processing power, databases and lookup-tables resident within the controller, mobile device, to provide a high quality multimedia viewing experience. Additionally functions and applications may be launched by touching and or pointing at certain images and or the entire screen. Additionally the touch and or pointer and or other means of activation is enabled to show relationships to the image in the form of text, voice and other attributes related to that specific image or subsets of the image or the entire screen.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the present invention and its practical application, to thereby enable others skilled in the art to best utilize the present invention and various embodiments, with various modifications, as are suited to the particular use contemplated. It is intended that the scope of the invention be defined by the Claims appended hereto and their equivalents.

We claim:

1. A mobile communications system for image networks comprising:
   a mobile device configured to communicate via at least one communications network, the mobile device further configurable to perform one or more of computing functions or voice communication functions, the mobile device configured with a display, and configurable to acquire and process a plurality of images, wherein the plurality of images comprise still images and video images, and wherein at least one image of the plurality of images is displayed on the mobile device display, and wherein a function is configured to automatically display information which corresponds to an object represented in the at least one image, wherein the object is a physical object separate from the mobile device, wherein the image is linked through a relationship to related data defined by a user or past user behavior stored on a server or the mobile device, wherein the mobile device acquires the images via a camera or image sensor in real time, wherein a set of functions or a toolbar of functions are overlayed or displayed on top on the image display; and
   at least one network server, the server configurable to store the plurality of images the server configured to receive an image from the mobile device, the server configured to associate each received image with a plurality of data comprising one or more of text data, voice data, mobile device profile data, user profile data, or location data.

2. The mobile communications system of claim 1 further comprising a executable function, wherein the executable function is displayed on the mobile device display, wherein the executable function comprises a function selected from the group consisting essentially of an application that renders at least one image of the plurality of images, and a routing process that transmits at least one image of the plurality of images through the communications network to a different mobile device or network element.

3. The mobile communications system of claim 1 wherein an executable function comprises a command sequence that is transmitted over a second network of the at least one communication network and that causes a physical change in the physical object corresponding to an object represented in the at least one image of the plurality of images.

4. The mobile communications system of claim 1 wherein each image of the plurality of images is encrypted with a security level and a compression format.

5. The mobile communications system of claim 1 wherein the plurality of images comprises a hierarchically organized set of images that are linked through the defined relationship to form the image network.

6. The mobile communications system of claim 5 wherein each image of the hierarchically organized set of images is encrypted with a respective security level, the security level configured to define a class of users privileged to access an associated image.

7. The mobile communications system of claim 5 wherein the defined relationship is learned by a software process based on past user behavior patterns and potential user behavior patterns.

8. The mobile communications system of claim 2 wherein the server is configurable to analyze the object recognized within the at least one image and determine the embedded executable function from a plurality of possible embedded functions associated with the at least one image to automatically actuate the process.

9. The mobile communications system of claim 8 wherein the object within the at least one image includes a user of the system, and further wherein the server is configurable to correlate the at least one image with the user profile data for the user of the system.

10. The mobile communications system of claim 2 further comprising: a user interface coupled to the at least one server, and configurable to enable a user to interact with the at least one image, including launching an application to perform a function that physically affects the object represented in the at least one image.

11. The mobile communications system of claim 10 wherein the object is physically affected through a network connected intelligent device that is proximate the object.

12. The mobile communications system of claim 10 wherein the user interface comprises a touch screen display device of a client computer coupled to the at least one server over a third network of the at least one communications network.

13. The mobile communications system of claim 2 further comprising an image switch and router component configured to perform a pattern recognition process on at least one object in the at least one image and transmit the at least one image of the plurality of images through the communications network to a different mobile device or network element.

14. The mobile communications system of claim 13 wherein the embedded executable function includes a function to retrieve a corresponding image from a data source coupled to the at least one communications network, wherein the corresponding image contains one of the at least one object and an object related to the at least one object through a defined relationship.

15. A mobile communications system for image networks comprising:
    a mobile device having a communications component to process voice or digital data and communicate over at least one communications network, and an image acquisition component to acquire and process a plurality of images, wherein each image is associated with multimedia information including image data, associated text data, audio data, or security information, and a function that automatically displays information which corresponds to an object represented in an image entity, wherein the object is a physical object separate from the mobile device, wherein the mobile device acquires the images via a camera or image sensor in real time, wherein a set of functions or a toolbar of functions are overlayed or displayed on top on an image display; and
    a network server, the server configurable to store the plurality of images, the server configured to receive an image from the mobile device, the server configured to associate each received image with mobile device profile data, user profile data, or location data, the server further configurable to link an image through a relationship to related data defined by a user or past user behavior stored on a server or the mobile device.

16. The mobile communications system of claim 15 wherein sub images of the image network comprise a plurality of images organized by a defined relationship based on the presence of an object represented in at least of the first image or the one or more sub images.

17. The mobile communications system of claim 16 wherein the defined relationship is provided by a process resident on the mobile device and is stored in a look-up table to enable dynamic look-up by a routing process that transmits the image network through the at least one communications network to one or more other network entities.

18. The mobile communications system of claim 16 wherein the defined relationship is provided by a process resident on the server and is stored in a look-up table to enable dynamic look-up by a routing process that transmits the image network through the at least one communications network to one or more other network entities.

19. The mobile communications system of claim 16 wherein the security information for each image of the image network defines user access privileges, and wherein the hierarchy provided by the defined relationship associates a different security level to at least some images of the image network.

20. The mobile communications system of claim 15 wherein the executable function comprises a function selected from the group consisting essentially of: an application that renders at least one image of the plurality of images; and a routing process that transmits at least one image of the plurality of images through the communications network to a different mobile device or network element.

21. The mobile communications system of claim 15 wherein the executable function comprises a command sequence that is transmitted over a second network of the at least one communications network and that causes a physical change in an object represented by at least one image of the plurality of images.

22. The mobile communications system of claim 21 wherein the server comprises an image recognition component to recognize an object in the at least one image and execute the embedded executable function to automatically actuate the process, and an image switch and router component configured to perform a pattern recognition process on at least one object in the at least one image and transmit the at least one image of the image network through the communications network to a different network element.

23. The mobile communications system of claim 21 wherein the multimedia information of the image network and the hierarchical relationship forming the image network are processed through a software process and associated databases resident on one of the mobile device and the server computer.

24. The mobile communications system of claim 15 wherein the image acquisition component comprises a digital camera resident within the mobile device, and wherein the plurality of image data comprises at least one of still images and video images.

25. A mobile communications system for image networks comprising:
    a mobile device having a communications component to process voice or digital data and communicate over at least one communications network, and an image acquisition component to acquire and process a plurality of images each image is associated with multimedia information including image data, associated text data, audio data, or security information, and a function that automatically displays information which corresponds to an object represented in an image entity, wherein the object is a physical object separate from the mobile device, and wherein the image is linked through a relationship to related data defined by a user or past user behavior stored on a server or the mobile device, wherein the mobile device acquires the images via a camera or image sensor in real time, wherein a set of functions or a toolbar of functions are overlayed or displayed on top on an image display; and
    a network server wherein the server is configured to store the plurality of images the server configured to receive an image from the mobile device, and the server further having an image switch and router component configured to perform a pattern recognition process on at least one object in the at least one image and transmit the at least one image of the image network through the communications network to a different network element.

26. The mobile communications system of claim 25 wherein the server is further configured to link the plurality of images with one another according to a hierarchical relationship of a first image and one or more sub images to form the image network, and wherein the sub images of the image network comprise a plurality of images organized by a defined relationship based on the presence of an object represented in at least of the first image or the one or more sub images.

27. The mobile communications system of claim 26 wherein the defined relationship is provided by a process resident on either of the server or the mobile device and is stored in a look-up table to enable dynamic look-up by the image switch and router component that transmits the image network through the at least one communications network to one or more other network entities.

28. The mobile communications system of claim 27 wherein the executable function comprises a function selected from the group consisting essentially of: an application that renders at least one image of the plurality of images; and a routing process that transmits at least one image of the plurality of images through the communications network to a different mobile device or network element.

29. The mobile communications system of claim 27 wherein the executable function comprises a command sequence that is transmitted over a second network of the at least one communication network and that causes a physical change in an object represented by at least one image of the plurality of images.

30. The mobile communications system of claim 1, wherein the mobile device includes a touch screen display, wherein at least a portion or subset of an image on the screen can be touched to launch one or more applications, control functions or actuation functions related to other intelligent devices.

31. The mobile communications system of claim 1, wherein the image network is propagated across a network of users based upon a profile of the mobile device user and one or more social, professional, personal or other network of the mobile device user is updated.

32. A mobile communications system for images comprising:
   a mobile device comprising a processor, camera, and wireless transmit and receive component;
   wherein the mobile device is configured to communicate via at least one wireless communications network;
   wherein the mobile device acquires an image using the camera or an image sensor;
   wherein the image is displayed on the screen of the mobile device;
   wherein an object represented in the image is identified by the mobile device;
   wherein the object is recognized using an image recognition program;
   wherein the recognized object corresponds to a physical object separate from the mobile device;
   wherein the mobile device displays text related to the recognized object on the display of the mobile device; and
   wherein a set of functions or a toolbar of functions are overlayed or displayed on top on the image screen.

33. The system of claim 32, wherein the text related to the recognized object is received from a server.

34. The system of claim 32, wherein the image recognition is performed on a server.

35. The system of claim 32, wherein the image recognition is performed by a processor on the mobile device.

36. The system of claim 32, wherein the text displayed on the mobile device display is dynamically generated by a server in response to the acquired image and identified object.

37. The system of claim 32, wherein the mobile device executes a function in response to the selection of a specified image area corresponding to the identified object and wherein the function controls the physical object.

38. The system of claim 37, wherein the control function comprises an on/off command.

39. The system of claim 37, wherein the recognized object is a garage door and wherein the control function controls a physical garage door.

40. The system of claim 37, wherein the pattern matching software is executed to identify objects in the acquired image on a server.

41. A system for interaction with virtual and physical items using a mobile device comprising:
   a mobile device further comprising a display and a camera, wherein the mobile device acquires an image using the camera, wherein the mobile device presents the images on the display of the device, wherein the function sends to an Internet server the acquired image, wherein the server performs image recognition on the image, wherein the server sends to the mobile device information related to the image, wherein the mobile device displays the information and the acquired image on the display of the mobile device; and wherein a set of functions or a toolbar of functions are overlayed or displayed on top on the image display.

42. The system of claim 41, wherein a user may touch a selected image area, wherein the mobile device executes a function in response to the selection of the specified image area.

43. A mobile image recognition system comprising:
   a mobile device, wherein the mobile device has a touch enabled display and processor;
   a display area on the mobile device; wherein the mobile device acquires images via camera and performs pattern recognition using the processor on the images to create a function, wherein the mobile device sends the images to a server, wherein a set of functions or a toolbar of functions are overlayed or displayed on top on an image in the display;
   a server, wherein the server receives the images from a mobile device, wherein the server performs pattern recognition of said images; and
   an interface on the mobile device which interacts with the display area through light, wherein the act of pointing at an image on the display area launches an application on the mobile device.

* * * * *